(12) United States Patent
Hauck et al.

(10) Patent No.: US 7,802,043 B2
(45) Date of Patent: Sep. 21, 2010

(54) METHODS AND APPARATUS FOR ADDING AN AUTONOMOUS CONTROLLER TO AN EXISTING ARCHITECTURE

(75) Inventors: Lane Thomas Hauck, San Diego, CA (US); Kenneth Jay Helfrich, Duluth, GA (US); David Alan Podsiadlo, San Diego, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 755 days.

(21) Appl. No.: 11/431,334

(22) Filed: May 9, 2006

(65) Prior Publication Data
US 2007/0136528 A1    Jun. 14, 2007

Related U.S. Application Data

(60) Provisional application No. 60/748,769, filed on Dec. 9, 2005.

(51) Int. Cl.
*G06F 13/00* (2006.01)
*G06F 13/36* (2006.01)

(52) U.S. Cl. .................. 710/304; 710/303; 710/306; 710/315

(58) Field of Classification Search ............... 710/304, 710/303, 306, 315
See application file for complete search history.

(56) References Cited

U.S. PATENT DOCUMENTS 5,887,145 A    3/1999    Harari et al.
6,603,736 B1 *    8/2003    Huber et al. ............ 370/228
2003/0041203 A1 *    2/2003    Jones et al. ............ 710/301
2003/0172219 A1    9/2003    Yao
2003/0233501 A1 *    12/2003    Ma et al. ............ 710/62
2005/0021891 A1    1/2005    Hsieh et al.

OTHER PUBLICATIONS

Philips Semiconductors, The I²C-bus specification, version 2.1, Jan. 2000, pp. 1-46.

* cited by examiner

*Primary Examiner*—Mark Rinehart
*Assistant Examiner*—Jeremy S Cerullo
(74) *Attorney, Agent, or Firm*—Blakely, Sokoloff, Taylor & Zafman LLP

(57) ABSTRACT

Methods and apparatus for adding an autonomous controller to an existing architecture such as by way of example, portable devices such as cell phones, MP3 players, and digital cameras. A circuit interposed between the memory card and the system controller of the device is controllable to couple the memory card to the system controller, or to couple the memory card to a high speed I/O controller on the circuit. When the memory card is coupled to the high speed I/O controller on the circuit, the circuit provides signals to the system controller indicative of a memory card removal event. In systems having an I/O connection such as a USB connection, the circuit also disconnects that connection from the system controller, provides signals to the system control indicative of a USB disconnect and connects the I/O connection to the memory card through a high speed data transfer unit to provide a higher speed I/O capability. Various features and capabilities are disclosed.

14 Claims, 6 Drawing Sheets

METHODS AND APPARATUS FOR ADDING AN AUTONOMOUS CONTROLLER TO AN EXISTING ARCHITECTURE

CROSS-REFERENCE TO RELATED APPLICATION

This application claims the benefit of U.S. Provisional Patent Application No. 60/748,769 filed Dec. 9, 2005.

BACKGROUND OF THE INVENTION

1. Field of the Invention

The present invention relates to the field of digital devices for storing large amounts of data, to and/or from which large amounts of data must be transferred.

2. Prior Art

FIG. 1 illustrates an architecture used in portable devices such as cell phones, MP3 players, and digital cameras. Such devices incorporate a removable or embedded memory card to store large amounts of data, for example digitized music or digital photographs.

A requirement of these devices is to attach to a personal computer in order to transfer data in and out of the memory card. While the memory card could be detached from the unit and plugged into a PC card reader, it is also desirable to have the unit itself function as a PC card reader/writer. For systems that lack this capability, it would be desirable to provide an easy way to add the capability. The preferred method for accomplishing the interface to a PC is a high speed USB connection to the PC.

DETAILED DESCRIPTION OF THE PREFERRED EMBODIMENTS

Figure 1:
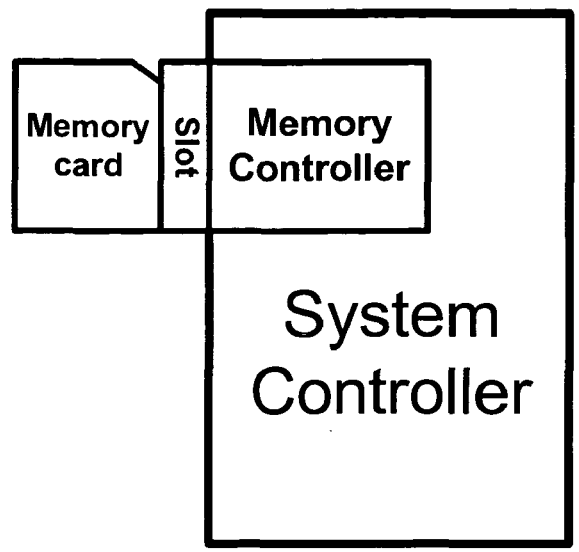
FIG. 1 is a block diagram illustrating an architecture used in portable devices such as cell phones, MP3 players, and digital cameras.

In the description to follow, reference is made to switches as part of the invention. It should be noted that at times, reference may be made to a "switch", both in the description to follow and in the claims. It is to be understood that a "switch" as used herein and in the claims means or includes a multiple line switch comprised of a plurality of individual switches. By way of but one example, a switch for a USB connection would include at least two individual switches, as the Universal Serial Bus transmits a differential signal over a twisted pair of conductors, both of which need switching to maintain system integrity. FIG. 1 illustrates an architecture used in portable devices such as cell phones, MP3 players and digital cameras.

Figure 2:
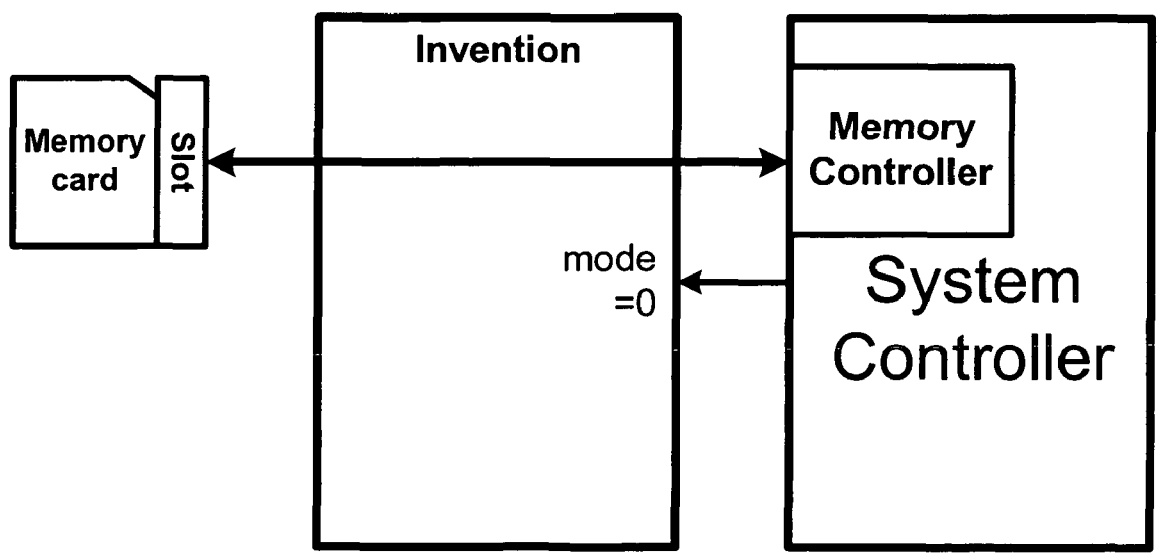
FIG. 2 is a block diagram of the inventive device as a circuit interposed between the System Controller's memory controller and the memory card of the architecture of FIG. 1.

FIG. 2 illustrates the inventive device as a circuit interposed between the System Controller's memory controller and the memory card. In this mode, the interposed circuit appears "invisible", as if it were not present in the system. A single control signal (mode) controls the operation of the inventive circuit. In its default state (for example with the mode pin low), the inventive circuit appears as in FIG. 2, and the memory controller operates as if the interposed circuit were not there.

Figure 3:
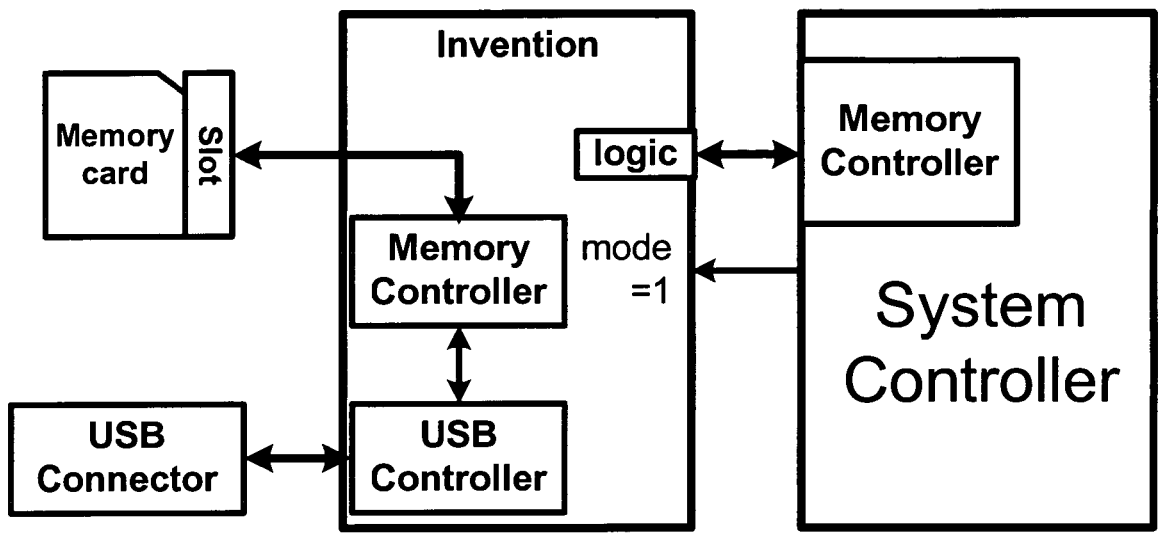
FIG. 3 is a block diagram similar to that of FIG. 2, though illustrating more detail of the interposed circuit of FIG. 2 when the System Controller has set the mode pin to the opposite state.

In FIG. 3, the System Controller has set the mode pin to the opposite state, to 1 in this example. This causes the inventive device to disconnect the memory card from the system controller, and to implement a "stand-alone" memory card reader/writer with an interface to a PC, for example using the USB (Universal Serial Bus). This connection offers the following advantages:

The System Controller does not need to implement program code or consume its own processor bandwidth to move data in and out of the memory card.

The System Controller requires a very small modification, at the minimum only one pin to control the mode signal.

When the inventive device is placed in the "card reader" mode (FIG. 3), the card interface signals to the system controller are replaced by new signals (shown as "logic" in FIG. 3). This logic mimics a "card removal" event. This insures coherence in the system. Because new data may be written or old data may be erased from the memory card by the inventive device (via the PC), it is important to appear to the System Controller that a "new" memory card has been inserted when it resets the mode pin to 0 to regain its access to the memory card.

Figure 4:
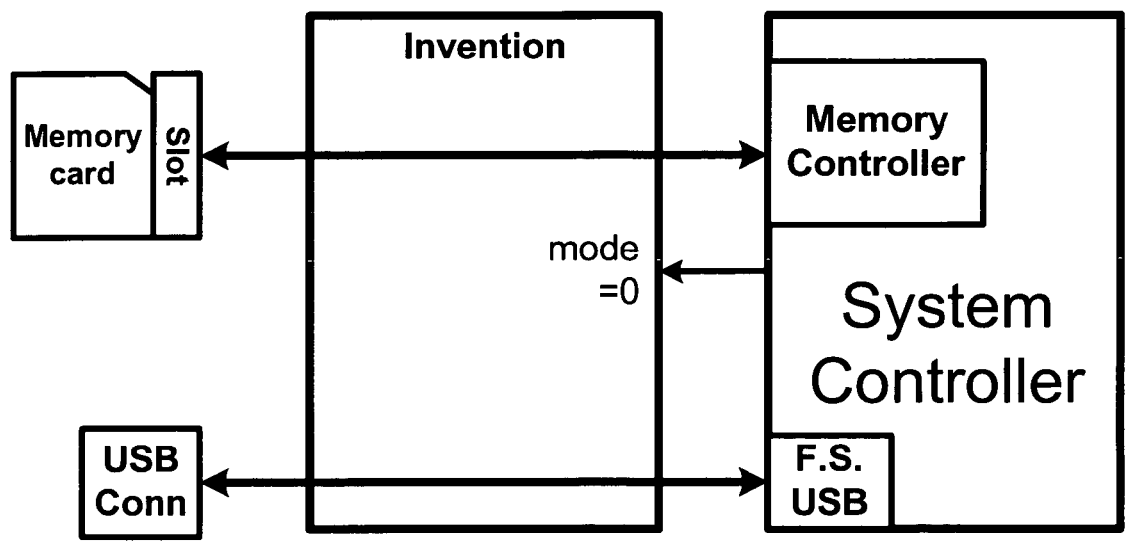
FIG. 4 is a block diagram of an alternate embodiment wherein the System Controller already includes a USB control unit such as a full-speed USB unit that operates at 12 Megabits per second.

In the embodiment of FIG. 4, the System Controller already includes a USB control unit, but this may be a full-speed USB unit that operates at 12 Megabits per second. This does not take advantage of the newer USB high-speed rate of 480 Megabits per second. As memory cards increase in size (1 Gigabyte cards are common, and larger sizes are available) the memory read and write times for large files provided by full-speed USB may be judged as unacceptably slow by users. For systems that already include a USB controller, the inventive device provides a second switching function (in addition to the memory card switching) that in the default state passes the USB signals from the System Controller directly to the USB connector. This preserves the normal operation of the System Controller in the same manner as for the memory card.

Figure 5:
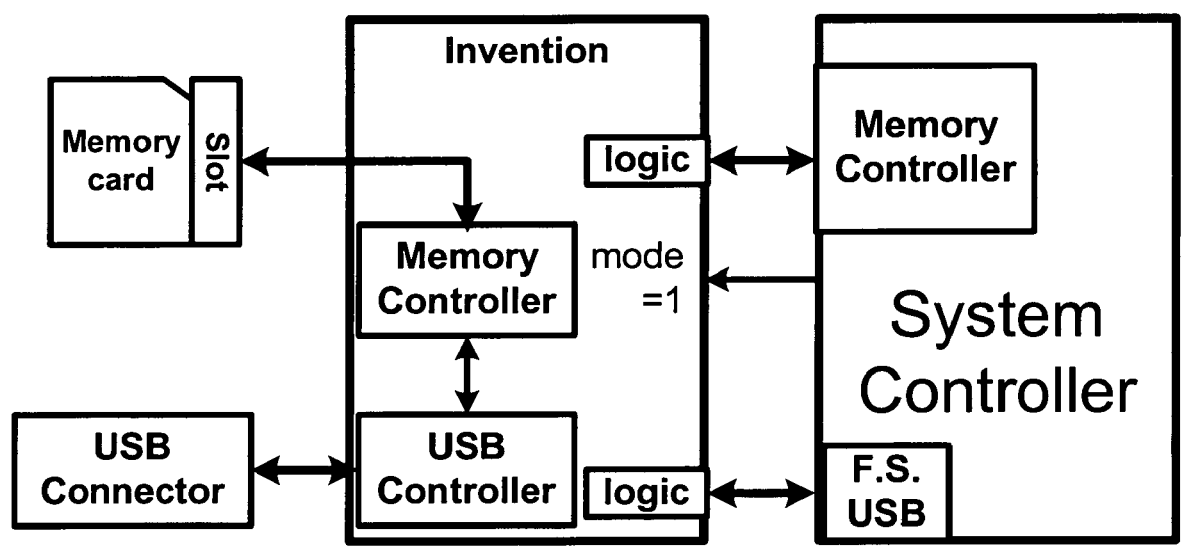
FIG. 5 illustrates the FIG. 4 system when the System Controller has changed the mode pin to the "card reader" mode.

FIG. 5 illustrates the FIG. 4 system when the System Controller has changed the mode pin to. the "card reader" mode. In this situation, internal logic in the inventive device mimics a USB disconnect event for the same reason it mimics a memory card removal event, namely system coherence. To elaborate, when the System Controller sets mode=1 in this example, if it is presently connected to the USB, the inventive device causes it to appear that the user has disconnected the USB cable to the PC. The inventive device is then free to use the USB connector without interfering with the USB firmware operating on the System Controller. When the System Controller switches the mode pin back to 0, the inventive device disconnects its USB controller from the connector and once again passes the signals from the USB connector through to the System Controller. When the user connects a PC to the USB connector, the System Controller will see this as a normal USB cable connection, and will proceed to operate its USB unit from a known reset state. Therefore no USB information used by the inventive device to access the memory card will interfere with the System Controller's use of its own USB port. This is an important factor in keeping with the design feature that the System Controller firmware does not require modification to use the inventive device.

The inventive device provides a minimum of one control single (the mode pin). For systems that can provide more signals, the inventive device provides means for more extensive control and status. For example, the I2C (Inter-Integrated Circuit) bus can be implemented using two pins as subsequently described, and the System Controller may use this bus to read and write multiple bits of information. Status information may include (but is not limited to):

Memory card status (card present, busy, operating voltage, speed, etc.)
USB port status (connected, busy, suspended, etc.)
General-purpose status flags
Added control bits may include:
Chip reset
Test/maintenance modes
General purpose signaling If the System Controller uses only the single mode pin, the inventive device uses built-in intelligence to effect a mode change. For example, if the System Controller does not check status information, and simply asserts the mode pin to its low state at any arbitrary time, the inventive device insures that it activates the mode switching in such a way that no data is lost. For example, if the System Controller sets mode=0 while a transfer from USB to the memory card is in progress, the inventive device does not effect the mode change until it safely completes the memory transfer.

Figure 6:
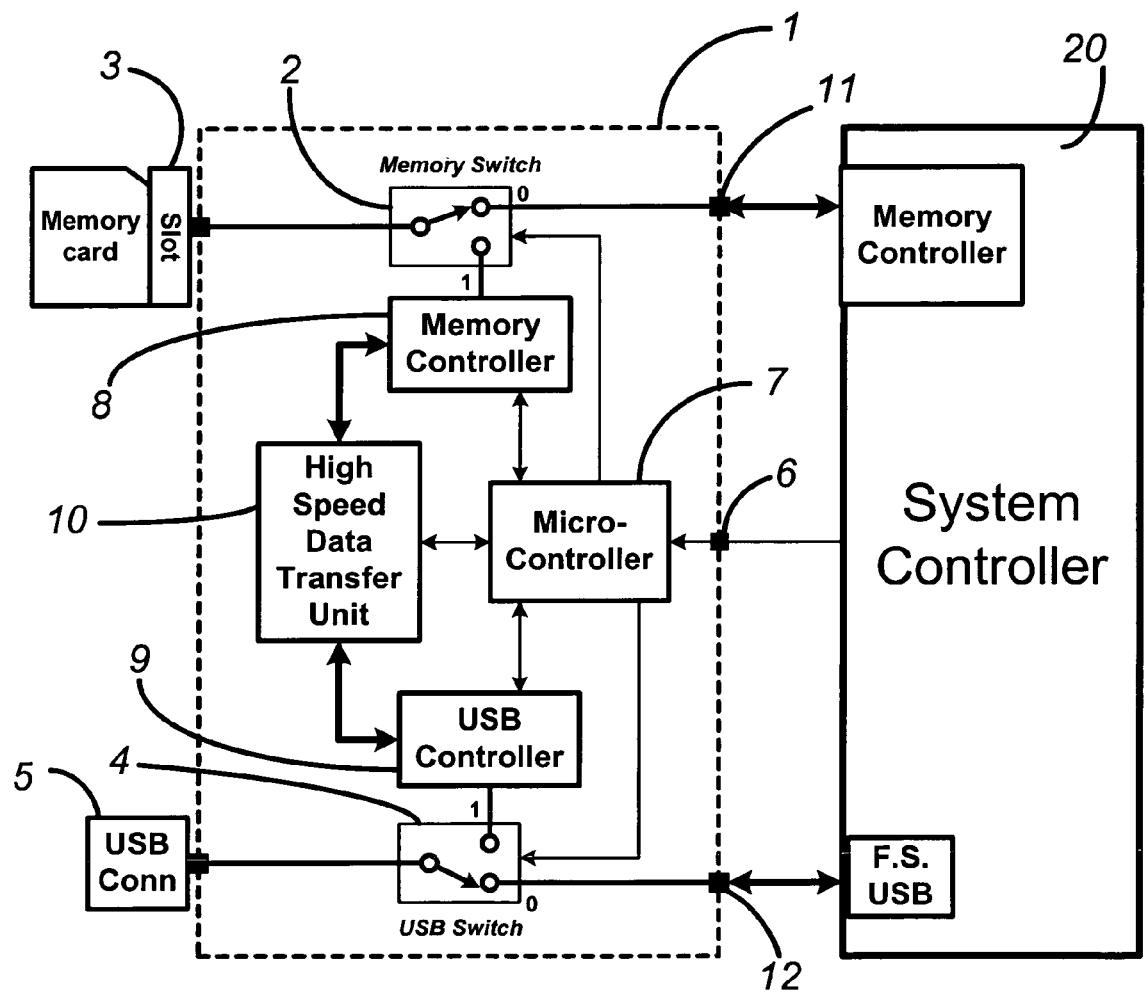
FIG. 6 is a block diagram illustrating an exemplary implementation of the present invention.

An exemplary implementation is shown in FIG. 6. The invention is shown in functional form within the dotted rectangle 1. A desirable implementation would be a single integrated circuit.

Switch 2 controls the connection to memory card connector 3, and switch 4 controls the connection to USB connector 5. Mode pin 6, supplied by the system controller 20, connects to microcontroller 7 to request a mode change. The "0" and "1" designations on the switches 2 and 4 indicate the switch settings for the two logic levels supplied on the mode pin 6. For example, in the FIG. 6 diagram, the mode pin is low, and the switches are in their "0" positions, corresponding to "pass-through" mode, in which the system controller 20 signals are passed through to their respective connectors.

Figure 7:
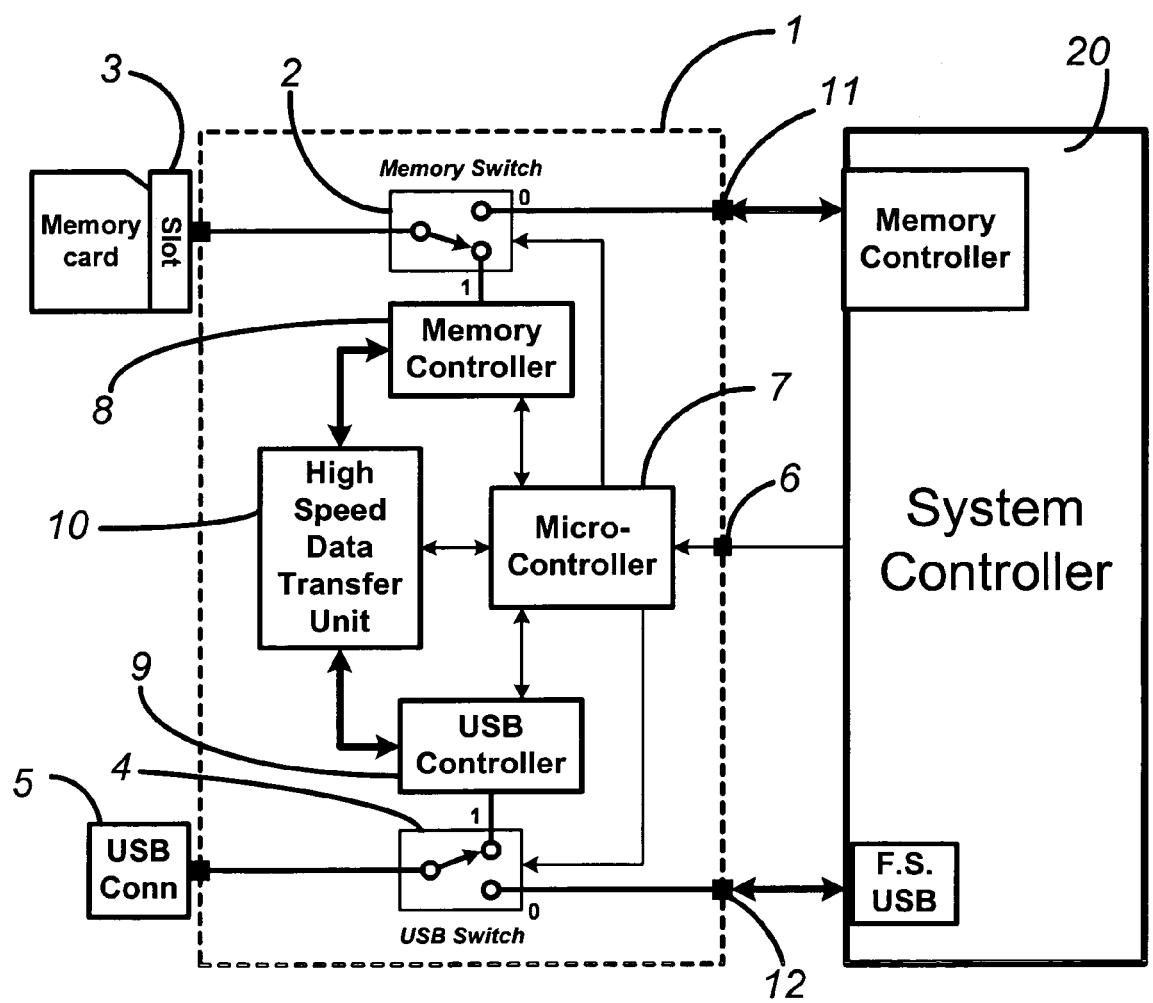
FIG. 7 is a block diagram similar to FIG. 6, but with the mode control in an opposite state.

When the system controller 20 drives the mode pin 6 to its logic high state, microcontroller 7 changes the states of switches 2 and 4 (as shown in FIG. 7) to connect the internal memory controller 8 to the memory connector 3, and to connect the internal USB controller 9 to the USB connector 5. The inventive chip 1 is thus enabled to operate as an autonomous USB card reader and writer when connected to a PC using USB connector 5.

The switches 2 and 4 are shown in simplified form in FIG. 6, showing only the data connections to the connectors 3 and 5. Additional logic drives the memory port 11 and USB port 12 (connected to the system controller 20) in the manner previously described to maintain system coherence, for example to mimic a card removal at the connection port 11. Specifically, logic attached to connector 12 disconnects the data pullup resistor on connector 12 which simulates a USB disconnect. Similarly, logic attached to connector 11 simulates a card removal in a manner that is compatible with the type of memory card for which the memory connector 11 is designed. For example, for a Secure Digital (SD) memory card, the logic disconnects the pullup resistor on pin 1 of the memory card to simulate a card removal. The specific method used to simulate a memory card removal will depend on the memory card used, as will be obvious to those skilled in the art. Other memory cards include, by way of example, CompactFlash, SmartMedia, and MemoryStick.

Internal microcontroller 7, for example a MAXQ core, available from Dallas/Maxim, provides the chip intelligence. In another implementation, this could also be a state machine implemented in logic. In the "card-reader" mode, microcontroller 7 enumerates, as a high-speed USB device, initializes the memory controller, and then orchestrates data transfers back and forth between the PC and the memory card over connectors 5 and 3, respectively.

A high-speed data transfer unit 10 attaches between the USB controller 9 and memory controller 8. This allows maximum speed transfers between the two controllers 8 and 9 without intervention by microcontroller 7.

Figure 8:
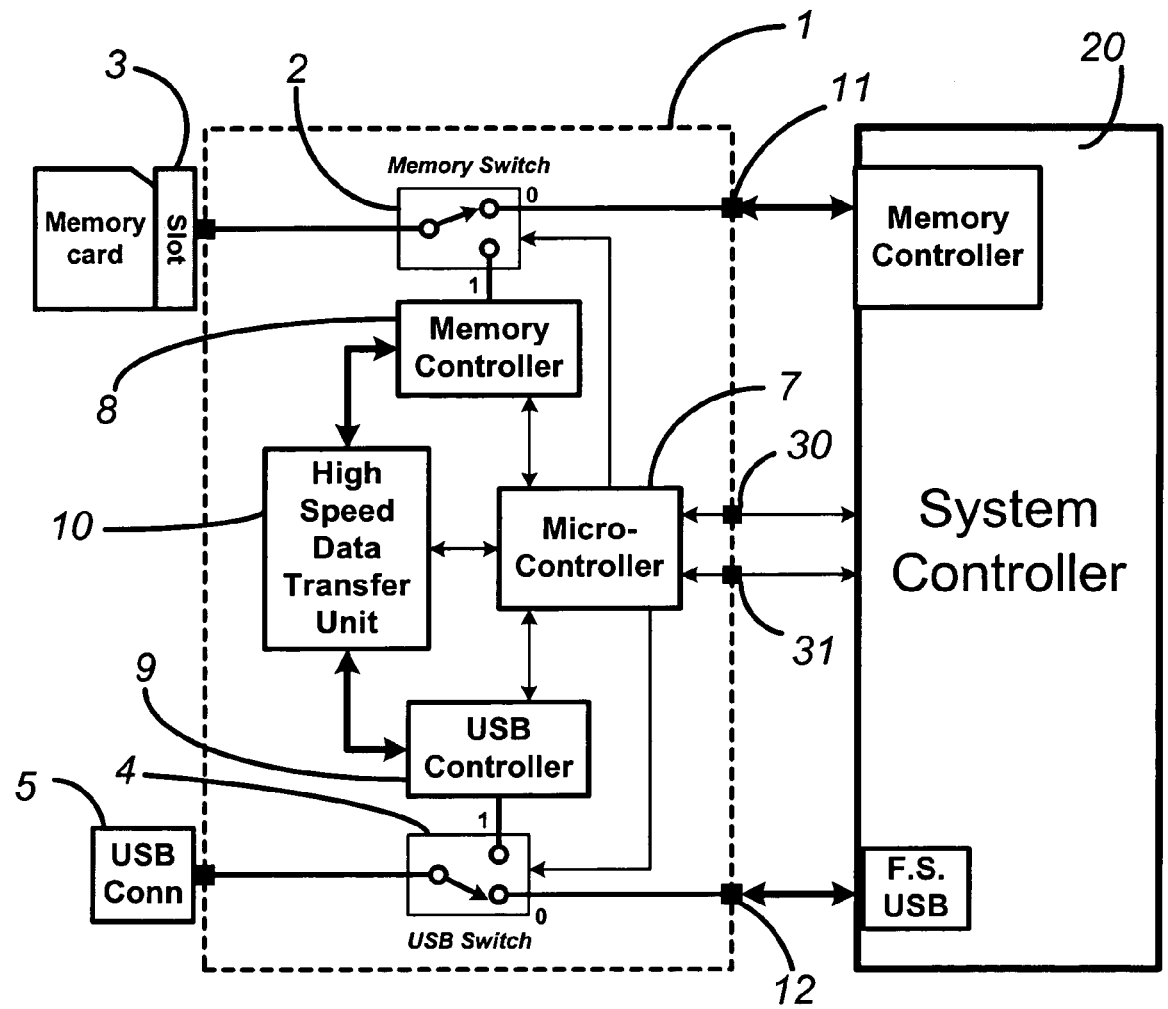
FIG. 8 is a block diagram of an embodiment of the present invention using a multiple pin data and control bus between the system controller and the present invention.

In FIG. 8, the single MODE pin 6 (FIG. 7) is replaced by two bidirectional pins 30 and 31 in order to convey expanded control and status information to and from the inventive device. As an example, a simple and well-known two-wire bus is the I2C bus, defined in "THE I2C-BUS SPECIFICATION, VERSION 2.1, JANUARY 2000" and available from Philips Semiconductor at http://www.semiconductors.philips.com/acrobat$_{13}$ download/literature/9398/39340011.pdf. Although the I2C bus is cited in this example, any bus capable of exchanging data to and from a device is suitable.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of adding an autonomous controller to an existing device architecture having a system controller, a memory card and a USB connection coupled to the system controller comprising:

coupling the system controller to the memory card and to the USB connection when the system controller provides a first control signal; and, when the system controller provides a second control signal, and without removing the memory card from the existing device, decoupling the system controller from the memory card and providing signals to the system controller indicative of a memory card removal event; and, coupling the memory card to a USB controller USB controller having a higher speed output than the system controller, and coupling the USB controller to the USB connection without interconnection through the system controller.

2. The method of claim 1 wherein the first and second control signals are digital control signals of opposite states coupled from the system controller on a single control line.

3. The method of claim 1 wherein the first and second control signals are digital control signals coupled from the system controller on a multiple line bus.

4. The method of claim 3 wherein the multiple line bus is an I2C bus.

5. The method of claim 1 wherein the method is practiced by adding a single integrated circuit to the existing device.

6. A method of adding an autonomous controller to an existing device architecture having a system controller, a memory card and a USB connection comprising:
  coupling the system controller to the memory card and the USB connection when the system controller provides a first control signal; and,
  when the system controller provides a second control signal, and without removing the memory card from the existing device,
    decoupling the system controller from the memory card and the USB connection;
    providing signals to the system controller indicative of a memory card removal event;
    providing signals to the system controller indicative of a USB disconnect;
    coupling the memory card to a USB controller without interconnection through the system controller; and,
    coupling the USB controller to the USB connection;
    the USB controller when connected to the USB connection providing higher speed USB communication than when the USB connection is coupled to the system controller.

7. The method of claim 6 wherein the first and second control signals are digital control signals of opposite states coupled from the system controller on a single control line.

8. The method of claim 6 wherein the first and second control signals are digital control signals coupled from the system controller on a multiple line bus.

9. The method of claim 8 wherein the multiple line bus is an I2C bus.

10. The method of claim 6 wherein the method is practiced by adding a single integrated circuit to the existing device.

11. Apparatus for adding an autonomous controller to an existing device architecture having a system controller, a USB connection and a memory card comprising an integrated circuit having:
  a memory controller, a high speed data transfer unit, a USB controller, a microcontroller and first and second switches;
  the first and second switches each having first and second switch positions;
  the first switch being adapted for coupling the memory card while in the device, to the system controller when in the first position and for coupling the memory card to the memory controller when in the second position;
  the second switch being adapted for coupling the USB connection to the system controller when in the first position and for coupling the USB connection to the USB controller when in the second position;
  the memory controller being coupled to the high speed data transfer unit and the high speed data transfer unit being coupled to the USB controller;
  the microcontroller being adapted to be responsive to at least one control signal to control the first and second switches to switch both switches from the first position to the second position, or from the second position to the first position, and to control the memory controller, the high speed data transfer unit and the USB controller;
  the USB controller when connected to the USB connection providing higher speed USB communication than when the USB connection is coupled to the system controller.

12. The apparatus of claim 11 wherein the microcontroller is adapted to be responsive to the at least one control signal from the system controller on a single control line.

13. The apparatus of claim 11 wherein the microcontroller is adapted to be responsive to and to respond to control signals from the system controller on a multiple line bus.

14. The apparatus of claim 13 wherein the multiple line bus is an I2C bus.

* * * * *